United States Patent
Yang et al.

(10) Patent No.: US 9,371,765 B2
(45) Date of Patent: Jun. 21, 2016

(54) METAL FILTER FOR PURIFYING EXHAUST GAS FROM SHIP, AND PREPARATION METHOD THEREOF

(71) Applicants: Hee-Sung Yang, Ulsan (KR); Joon-Ho Ko, Ulsan (KR); Chan-Do Park, Ulsan (KR); Seok-Lyong Song, Ulsan (KR); Jae-Woo Lee, Ulsan (KR); Sung-Young Lee, Ulsan (KR); Jai-Hyun Park, Ulsan (KR); Kyoung-Jae Kim, Gyeongsangnam-do (KR); Seung-Han Han, Seoul (KR); Young-Jin Cho, Gyeongsangnam-do (KR); Tae-Min Kim, Seoul (KR); Ju-Yong Jung, Chungcheongnam-do (KR)

(72) Inventors: Hee-Sung Yang, Ulsan (KR); Joon-Ho Ko, Ulsan (KR); Chan-Do Park, Ulsan (KR); Seok-Lyong Song, Ulsan (KR); Jae-Woo Lee, Ulsan (KR); Sung-Young Lee, Ulsan (KR); Jai-Hyun Park, Ulsan (KR); Kyoung-Jae Kim, Gyeongsangnam-do (KR); Seung-Han Han, Seoul (KR); Young-Jin Cho, Gyeongsangnam-do (KR); Tae-Min Kim, Seoul (KR); Ju-Yong Jung, Chungcheongnam-do (KR)

(73) Assignees: HYUNDAI HEAVY INDUSTRIES CO., LTD., Ulsan (KR); HYUNDAI BNGSTEEL CO., LTD., Changwon-si, Gyeongsangnam-do (KR); E&D CO., LTD., Cheongju-si, Chungcheongbuk-do (KR)

( * ) Notice: Subject to any disclaimer, the term of this patent is extended or adjusted under 35 U.S.C. 154(b) by 321 days.

(21) Appl. No.: 14/232,807
(22) PCT Filed: Mar. 22, 2013
(86) PCT No.: PCT/KR2013/002383
§ 371 (c)(1),
(2) Date: Jan. 14, 2014
(87) PCT Pub. No.: WO2013/147465
PCT Pub. Date: Oct. 3, 2013

(65) Prior Publication Data
US 2014/0170032 A1  Jun. 19, 2014

(30) Foreign Application Priority Data
Mar. 28, 2012 (KR) .................. 10-2012-0031616

(51) Int. Cl.
*B01D 50/00* (2006.01)
*F01N 3/28* (2006.01)
(Continued)

(52) U.S. Cl.
CPC ............ *F01N 3/281* (2013.01); *B01D 53/9413* (2013.01); *F01N 3/022* (2013.01);
(Continued)

(58) Field of Classification Search
CPC . F01N 3/035; F01N 2330/02; F01N 2510/06; B01D 2255/20707; B01D 53/9413
USPC .................................................. 422/177, 180
See application file for complete search history.

(56) References Cited

U.S. PATENT DOCUMENTS 6,475,944 B1  11/2002  Yang et al.
6,892,529 B2   5/2005  Duvinage et al.
(Continued)

FOREIGN PATENT DOCUMENTS

CN   1420800 A    5/2003
JP   54-122690 A  9/1979
(Continued)

OTHER PUBLICATIONS

Ho Jeong Chae et al., "Selective Catalytic Reduction of $NO_x$ by $NH_3$ over $V_2O_5$/Ti-PILC Catalyst", Hwahak Konghak, Dec. 2000, pp. 783-790, vol. 38, No. 6.

*Primary Examiner* — Tom P Duong
(74) *Attorney, Agent, or Firm* — Rabin & Berdo, P.C.

(57) ABSTRACT

The present invention relates to a metal filter for purifying the exhaust gas from a ship, and a preparation method thereof. The purpose of the present invention is to provide: a metal filter for purifying the exhaust gas from a ship, capable of reducing nitrogen oxide by 85% or more at 250-300° C.; and a preparation method thereof. The metal filter for removing nitrogen oxide contained in the exhaust gas from a ship of the present invention comprises an integrated catalyst, wherein a metal substrate comprising irregularities is coated with a low temperature active catalyst in which vanadium (V), tungsten (W) and alumina sol are supported in a Ti-pillared clay (Ti-PILC) powdered support.

4 Claims, 4 Drawing Sheets

(51) Int. Cl.
*F01N 3/022* (2006.01)
*F01N 3/035* (2006.01)
*B01D 53/94* (2006.01)

(52) U.S. Cl.
CPC ....... *F01N 3/035* (2013.01); *B01D 2255/2092* (2013.01); *B01D 2255/20707* (2013.01); *B01D 2255/20723* (2013.01); *B01D 2255/20776* (2013.01); *F01N 2330/02* (2013.01); *F01N 2330/22* (2013.01); *F01N 2510/06* (2013.01)

(56) References Cited

U.S. PATENT DOCUMENTS

| 2003/0209011 | A1 | 11/2003 | Duvinage et al. | |
|---|---|---|---|---|
| 2006/0094594 | A1* | 5/2006 | Koch | B01D 53/94 502/232 |
| 2007/0104633 | A1* | 5/2007 | Rinaldi | B01D 53/9418 423/239.1 |

FOREIGN PATENT DOCUMENTS

| JP | 55-013127 | A | | 1/1980 | |
|---|---|---|---|---|---|
| JP | 56-097548 | A | | 8/1981 | |
| JP | 05-154351 | A | | 6/1993 | |
| JP | 2001-300309 | A | | 10/2001 | |
| JP | 2006-501064 | A | | 1/2006 | |
| JP | 2007-032400 | A | | 2/2007 | |
| JP | 2007-529300 | A | | 10/2007 | |
| KR | 1020060099611 | | * | 9/2006 | ............. B01J 37/025 |
| KR | 10-0969060 | B1 | | 7/2010 | |
| KR | 10-1100851 | B1 | | 1/2012 | |
| KR | 10-2012-0084040 | A | | 7/2012 | |

* cited by examiner

METAL FILTER FOR PURIFYING EXHAUST GAS FROM SHIP, AND PREPARATION METHOD THEREOF

TECHNICAL FIELD

The present invention relates to a metal filter for purifying exhaust gases from ships and a method of manufacturing the same, and more particularly, to a metal filter for purifying exhaust gases from ships, which is formed by coating a metal substrate having irregularities with a low-temperature active catalyst composed of Ti-PILC (Pillared Clay) as a powder support and vanadium (V), tungsten (W) and alumina sol supported thereon, and to a method of manufacturing the same.

BACKGROUND ART

Exhaust gases of cars and ships with internal combustion engines contain nitrogen oxide (NOx) such as NO, $NO_2$, $N_2O$, etc., which is a cause of photochemical smog or acid rain. In order to reduce nitrogen oxide emissions, typically useful is a filter for purifying exhaust gases by spraying a reductant such as ammonia or urea onto exhaust gases so that the exhaust gases are converted into harmless $N_2$ and $H_2O$ via an active catalytic reaction.

NOx emissions are being strictly regulated by laws. Particularly, International Maritime Organization (IMO) has strengthened regulations for NOx emissions from ship engines so that the NOx emissions will be reduced from 14.4 g to 3.4 g per h from 2016 in order to prevent marine pollution.

Generally, exhaust gases of car engines contain less than 10 ppm of sulfur and have a temperature at 250~450° C., whereas exhaust gases of ship engines contain 500 ppm or more of sulfur and 10% or more of water and have a temperature of 250~350° C. A filter for purifying exhaust gases for use in ship engines is required to have resistance to water and sulfur and to be efficiently active at a temperature of 300° C. or less, compared to a filter for purifying exhaust gases for use in cars.

Conventional NOx reduction techniques for use in ships and plants include an extruded catalytic filter manufactured by extruding a catalyst material such as vanadia ($V_2O_5$), but such an extruded catalytic filter has a very large volume due to too low cell density and does not satisfy Tier III corresponding to regulations for ships because of drastically lowered catalytic activity at low temperature.

The following [Table 1] shows the results of test of NOx reduction efficiency of the conventional extruded catalytic filter composed of vanadia ($V_2O_5$) and PILC (Pillared Interlayer Clay) in the temperature range of 250~300° C., in which the test conditions are $N_2$ balance, NO 1000 ppm, $NH_3$ 1000 ppm, $O_2$ 11%, Water 10%, CO 100 ppm, $CO_2$ 5%, $SO_2$ 500 ppm, THC 100 ppm and SV (Space velocity) 10000 $h^{-1}$.

TABLE 1

| Temp. (° C.) | 250 | 255 | 260 | 265 | 270 | 275 | 280 | 285 | 290 | 295 | 300 |
|---|---|---|---|---|---|---|---|---|---|---|---|
| DeNox (%) | 67 | 68 | 69 | 72 | 74 | 75 | 76 | 77 | 79 | 81 | 81 |

As is apparent from [Table 1], it is conventionally impossible to achieve NOx reduction efficiency of 85% or more at 300° C. or less. Hence, there is an urgent need to develop active catalyst techniques adapted for preventing environmental pollution and marine pollution and for strengthening regulations thereof.

CITATION LIST (Patent Document 1) Korean Patent No. 10-0969060 (2010 Jul. 1)

DISCLOSURE

Technical Problem

Accordingly, an object of the present invention is to provide a metal filter for purifying exhaust gases from ships and a method of manufacturing the same, wherein the metal filter may exhibit NOx reduction efficiency of 85% or more in the temperature range of 250~300° C.

Technical Solution

The present invention provides a metal filter for removing NOx from exhaust gases of ships, including a metal substrate having irregularities and a low-temperature active catalyst applied thereon and composed of Ti-PILC (Pillared Clay) as a powder support and vanadium (V), tungsten (W) and alumina sol supported thereon.

According to the present invention, the metal filter is configured such that the metal substrate having irregularities is coated with the low-temperature active catalyst suitable for use therein, and thus high NOx reduction efficiency of 85% or more in the low-temperature range of 250~300° C. can be stably obtained. In particular, in the case where the metal filter according to the present invention is applied to treatment of exhaust gases from ships in the exhaust gas temperature range of 250° C. or less, remarkably higher purification performance can be ensured, compared to conventional techniques for treating exhaust gases from ships.

Also, according to the present invention, because the bondability of the applied low-temperature active catalyst is enhanced thanks to irregularities formed on the metal substrate, the metal filter of the invention can exhibit very superior adhesion and bondability in water, compared to conventional extruded low-temperature active catalyst filters for use in purifying exhaust gases from ships, thus preventing NOx purification performance from deteriorating as a result of decreasing the low-temperature active catalyst site due to separation of the low-temperature active catalyst from the substrate over time, ultimately achieving extended lifetime of the filter.

Also, according to the present invention, the efficiency of the metal filter can be effectively increased by virtue of the low-temperature active catalyst adapted for a metal filter for purifying exhaust gases from ships.

DESCRIPTION OF THE REFERENCE NUMERALS IN THE DRAWINGS

10: metal substrate
11: irregularities
20: low-temperature active catalyst
100: metal filter

MODE FOR INVENTION

Figure 1:
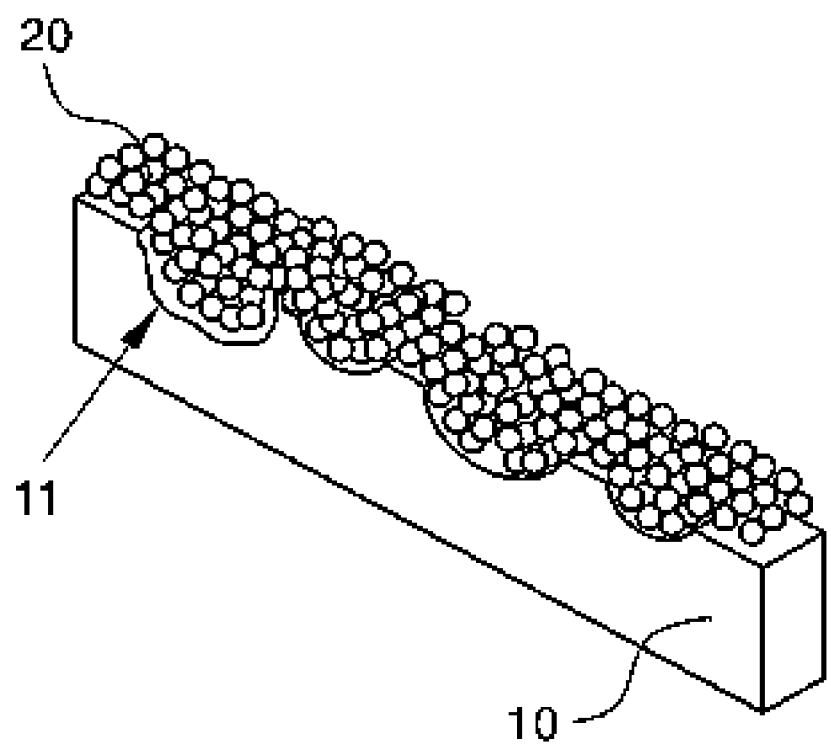
FIG. 1 illustrates a metal filter according to the present invention.

FIG. 1 illustrates a metal filter according to the present invention. In a metal filter for purifying exhaust gases from ships according to the present invention, which removes NOx from the exhaust gases, the metal filter 100 is configured such that a metal substrate 10 having irregularities 11 is coated with a low-temperature active catalyst 20 composed of Ti-PILC (Pillared Clay) as a powder support and vanadium (V), tungsten (W) and alumina sol supported thereon.

The low-temperature active catalyst 20 is used to remove NOx from exhaust gases, and includes a powder support Ti-PILC (Pillared Clay) and 1~10 parts by weight of a V precursor, 1~5 parts by weight of a W precursor and 5~20 parts by weight of alumina sol based on 100 parts by weight of Ti-PILC.

Also, the low-temperature active catalyst may further include, based on 100 parts by weight of Ti-PILC, 1~5 parts by weight of a cerium (Ce) precursor, 5~20 parts by weight of a titanium dioxide ($TiO_2$) precursor, 1~6 parts by weight of an iron (Fe) precursor, and 1~5 parts by weight of sulfur dioxide ($SO_2$).

Herein, V, W, Ce, Fe and $SO_2$ are promoters which may activate the low-temperature active catalyst, and may actively induce oxidation/reduction at comparatively lower temperature, compared to an extruded low-temperature active catalyst.

Also, Ce, Fe and $SO_2$ may enhance resistance to sulfur, and may stabilize the structure of V, W and PILC, thus ensuring performance of the low-temperature active catalyst in terms of stability and durability.

The promoters are added to a solid low-temperature active catalyst in order to increase the activity of the catalyst in a chemical reaction. Although promoters alone do not function as a catalyst, some of them may interact with the active component of the catalyst and thus change the electronic structure or crystalline structure of the active solid component, thereby altering chemical effects on a material which undergoes a catalytic function.

If the amount of any promoter metal component exceeds the upper limit, it may be deposited on the active surface of metal due to aggregation or overlapping, rather than being uniformly dispersed on the PILC support, undesirably deteriorating catalytic performance. In contrast, if the amount thereof is less than the lower limit, dispersivity may decrease, resulting in poor performance. In the case where the promoters are added at a predetermined mixing ratio, superior activity may result.

The alumina sol is a sol having a needle-shaped structure of alumina alone.

Figure 2:
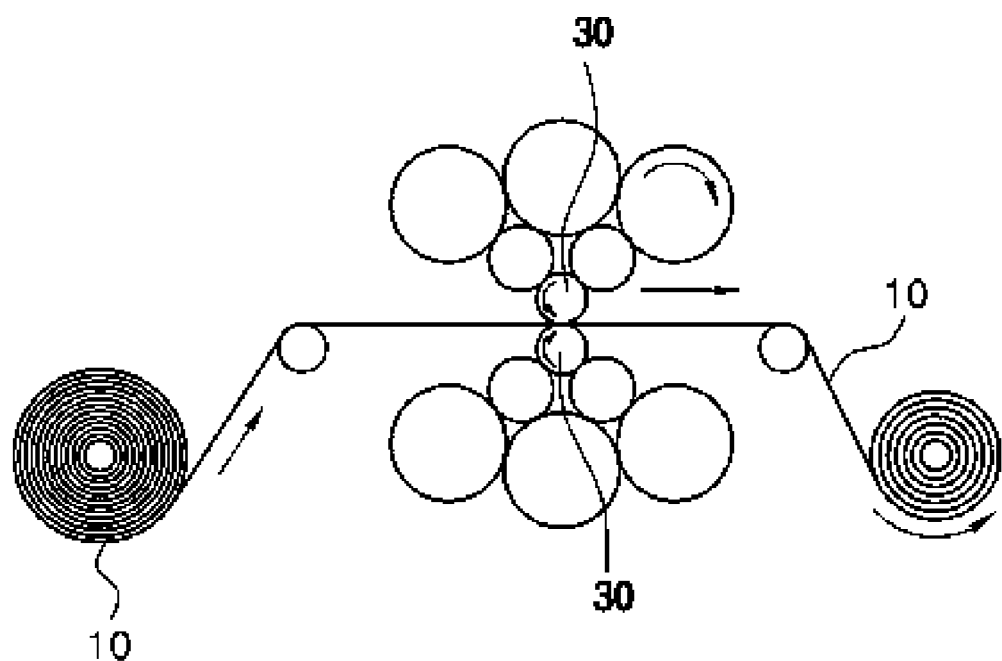
FIG. 2 illustrates a process of forming irregularities of a metal substrate according to the present invention.
Figure 3:
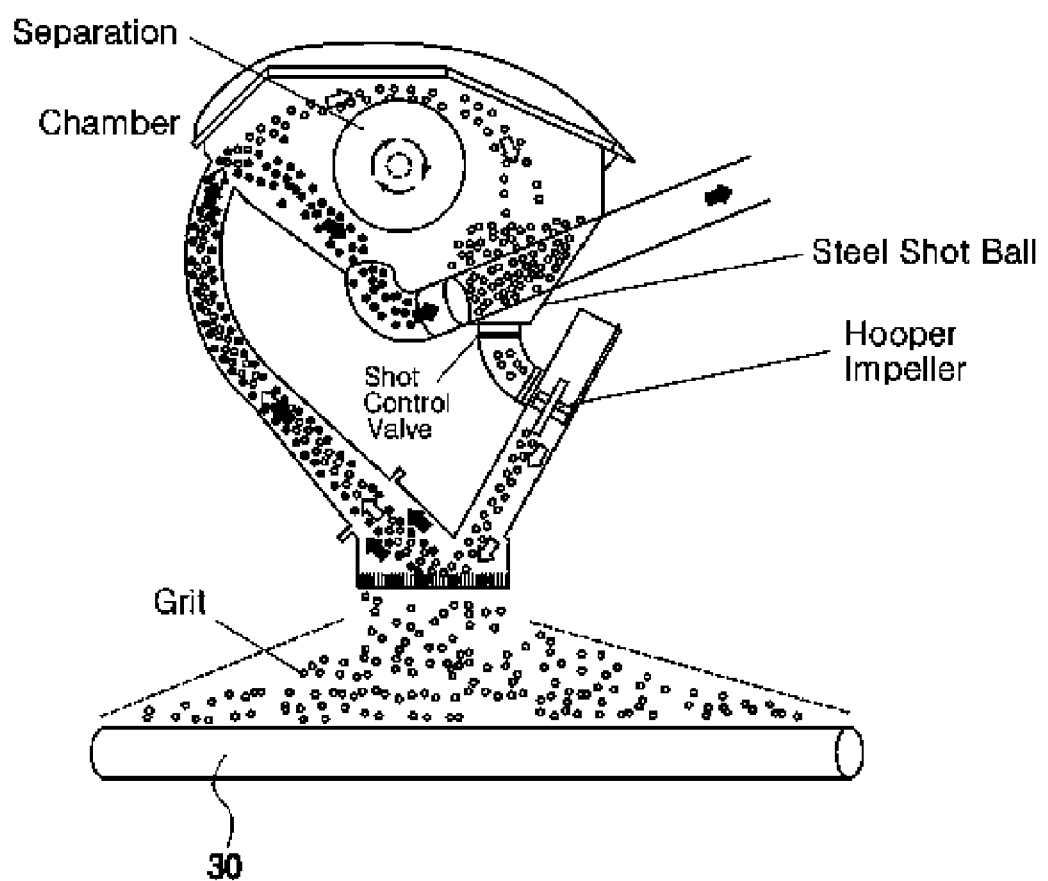
FIG. 3 illustrates formation of irregularities on the surface of a roller using shot blasting.

The metal substrate is used to form the metal filter, and the material thereof is not particularly limited and a plurality of irregularities is provided on the surface thereof. As shown in FIGS. 2 and 3, the metal substrate has a plurality of irregularities at the surface thereof by means of rollers 30 on which irregularities are formed using shot blasting, and the irregularities formed on the metal substrate increase the contact area with the low-temperature active catalyst, thus enhancing adhesion of the low-temperature active catalyst.

The surface of the metal substrate 10 is imparted with irregularities which further enlarge the coating area per unit area of the low-temperature active catalyst, compared to a planar plate. When the low-temperature active catalyst 20 is applied onto the metal substrate 10 having irregularities in this way, the edge of the low-temperature active catalyst 20 attached to the metal substrate 10 has a smaller angle, compared to when attached to a planar metal plate, and contact occurs over the larger area even in the same mass.

Figure 4:
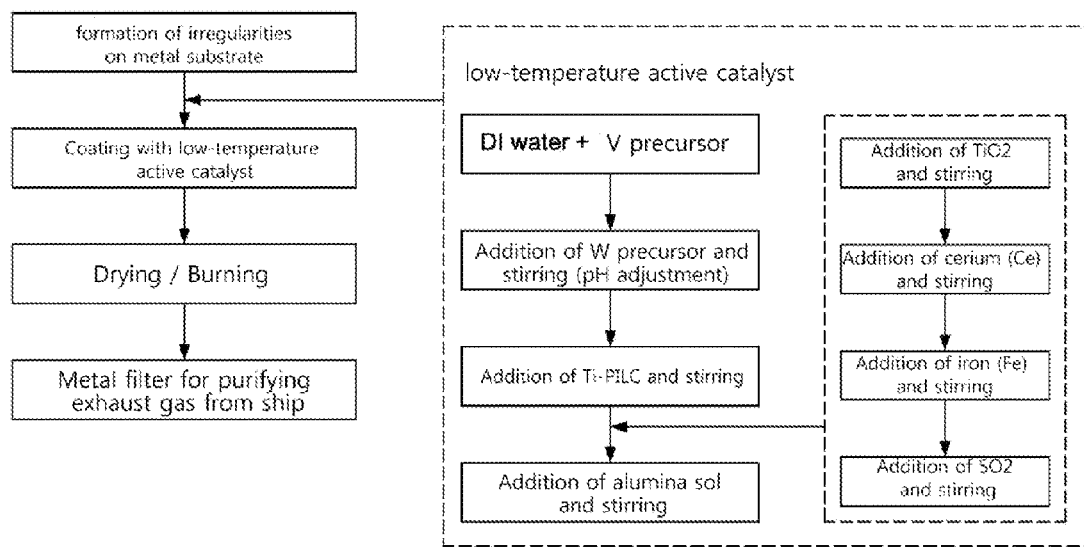
FIG. 4 illustrates a block diagram of a process of manufacturing a metal filter according to the present invention.

FIG. 4 illustrates a block diagram of a process of manufacturing the metal filter according to the present invention. This metal filter is manufactured by:

forming irregularities on a metal substrate; and immersing the metal substrate having irregularities in a solution of a low-temperature active catalyst in a slurry state or applying the low-temperature active catalyst onto the metal substrate using a coater, thus coating the substrate with the low-temperature active catalyst.

Also, the low-temperature active catalyst is prepared in a slurry state by:

1) stirring deionized (DI) water and a V precursor;

2) adding a W precursor and stirring the resulting mixture while performing pH adjustment to 2~3;

3) adding Ti-PILC and stirring the resulting mixture; and 4) adding alumina sol and stirring the resulting mixture.

The Ti-PILC may include Ti-PILC disclosed in Korean Patent No. 10-0415434, or known Ti-PILC obtained by substituting PILC (Pillared Clay) with Ti using ion exchange, and a description thereof is omitted. In the present invention, preferably useful is Ti-PILC disclosed in Korean Patent No. 10-0415434.

The preparation of the low-temperature active catalyst may further include, after 3) and before 4), 3a) adding $TiO_2$ and stirring the resulting mixture; 3b) additionally adding at least one selected from among a Ce precursor, a Fe precursor and a $SO_2$ precursor and stirring the resulting mixture.

Also, step 3b) may further include, for example, 3b-1) stirring the mixture obtained in 3a) and the Ce precursor; 3b-2) stirring the mixture obtained in 3a), the Ce precursor and the Fe precursor; and 3b-3) stirring the mixture obtained in 3a), the Ce precursor, the Fe precursor and the $SO_2$ precursor.

In the present invention, step 1) for about 10~15 min, step 2) for 10~30 min, step 3) for 1~2 hrs, step 3a) for 1~2 hrs, step 3b) for 30~50 min each and preferably 30 min each, and step 4) for about 25~35 min are continuously carried out.

The preparation of the low-temperature active catalyst as above is performed at 50~80° C., and Ti-PILC and DI water (ion-free pure water) are provided at a weight ratio of 3~5:6~8. For example, 30~50 g of Ti-PILC and 60~80 ml of DI water are provided.

Also upon preparation of the low-temperature active catalyst, the V precursor, W precursor, Fe precursor, $SO_2$ precursor, Ce precursor and $TiO_2$ added in individual steps are used in such a way that, based on 100 parts by weight of Ti-PILC, 1~10 parts by weight of V, 1~5 parts by weight of W, 5~20 parts by weight of $TiO_2$, 1~6 parts by weight of Fe, 1~5 parts by weight of Ce, and 1~5 parts by weight of $SO_2$ are contained.

The V precursor and the W precursor are not particularly limited, and, for example, the V precursor may include ammonium metavanadate ($NH_4VO_3$) or vanadium oxytrichloride ($VOCl_3$), and the W precursor may include ammonium tungstate (($NH_4)10H_2(W_2O_7)_6$). Furthermore, individual precursors include known metal precursors such as a nitrate, etc., and a description thereof is omitted.

A better understanding of the present invention may be obtained via the following examples.

Example 1

By sequentially performing 1) stirring DI water and a V precursor for 30 min; 2) adding a W precursor and stirring the resulting mixture for 30 min while performing pH adjustment to 2~3; 3) adding Ti-PILC and stirring the resulting mixture for 2 hr; 3a) adding $TiO_2$ and stirring the resulting mixture for 2 hr; 3b) adding a Ce precursor and stirring the resulting mixture for 30 min; and 4) adding alumina sol and stirring the resulting mixture for 30 min, a low-temperature active catalyst in a slurry state was prepared, including a PILC support Ti-PILC, and 100 parts by weight of Ti-PILC, 3 parts by weight of V, 3 parts by weight of W, 5 parts by weight of $TiO_2$, 2 parts by weight of Ce, and 8 parts by weight of alumina sol.

As such, Ti-PILC and DI (De-ionized) water (ion-free pure water) were provided at a weight ratio of 4:7.

Example 2

A metal substrate (made of stainless steel) having irregularities was coated with the low-temperature active catalyst in a slurry state of Example 1, dried and burned, thus forming a metal filter coated with a low-temperature active catalyst, which was then tested for NOx reduction efficiency in the temperature range of 250~300° C. The results are shown in [Table 2] below.

TABLE 2

| Temp. (° C.) | 250 | 255 | 260 | 265 | 270 | 275 | 280 | 285 | 290 | 295 | 300 |
|---|---|---|---|---|---|---|---|---|---|---|---|
| DeNox (%) | 80 | 80 | 82 | 83 | 85 | 85 | 86 | 88 | 89 | 90 | 92 |

(Test conditions: $N_2$ balance, NO 1000 ppm, $NH_3$ 1000 ppm, $O_2$ 11%, Water 10%, CO 100 ppm, $CO_2$ 5%, $SO_2$ 500 ppm, THC 100 ppm, SV (Space Velocity) 20000 $h^{-1}$)

As is apparent from [Table 2], NOx reduction efficiency was 80% or more at 250° C. or higher, and 90% at 295° C. or higher.

Example 3

A ceramic substrate (e.g. a Cordierite substrate) having irregularities was coated with the low-temperature active catalyst in a slurry state of Example 1, dried and burned, thus forming a ceramic metal filter (a honeycombed substrate made of cordierite) coated with a low-temperature active catalyst, which was then tested for NOx reduction efficiency in the temperature range of 250~300° C. The results are shown in [Table 2] below. The test conditions are the same as in Example 2.

TABLE 3

| Temp. (° C.) | 250 | 255 | 260 | 265 | 270 | 275 | 280 | 285 | 290 | 295 | 300 |
|---|---|---|---|---|---|---|---|---|---|---|---|
| DeNox (%) | 82 | 82 | 82 | 83 | 84 | 84 | 88 | 89 | 89 | 90 | 91 |

As is apparent from [Table 3], NOx reduction efficiency was 82% or more at 250° C. or higher, and 90% at 295° C. or higher.

Example 4

By sequentially performing 1) stirring DI water and a V precursor for 30 min; 2) adding a W precursor and stirring the resulting mixture for 30 min while performing pH adjustment to 2~3; 3) adding Ti-PILC and stirring the resulting mixture for 2 hr; 3a) adding $TiO_2$ and stirring the resulting mixture for 2 hr; 3b-1) adding a Ce precursor and stirring the resulting mixture for 30 min; 3b-2) adding a Fe precursor and stirring the resulting mixture for 30 min; and 4) adding alumina sol and stirring the resulting mixture for 30 min, a low-temperature active catalyst in a slurry state was prepared, including a PILC support Ti-PILC, and 100 parts by weight of Ti-PILC, 3 parts by weight of V, 3 parts by weight of W, 5 parts by weight of $TiO_2$, 2 parts by weight of Ce, 3 parts by weight of Fe and 15 parts by weight of alumina sol.

As such, Ti-PILC and DI (De-ionized) water (ion-free pure water) were provided at a weight ratio of 4:7.

Example 5

A metal substrate (made of stainless steel) having irregularities was coated with the low-temperature active catalyst in a slurry state of Example 4, dried and burned, thus forming a metal filter coated with a low-temperature active catalyst, which was then tested for NOx reduction efficiency in the temperature range of 250~300° C. The results are shown in [Table 4] below. As such, the test conditions are the same as in Example 2.

TABLE 4

| Temp. (° C.) | 250 | 255 | 260 | 265 | 270 | 275 | 280 | 285 | 290 | 295 | 300 |
|---|---|---|---|---|---|---|---|---|---|---|---|
| DeNox (%) | 87 | 87 | 87 | 88 | 88 | 88 | 89 | 89 | 90 | 90 | 90 |

As is apparent from [Table 4], NOx reduction efficiency was 87% or more at 250° C. or higher, and 90% at 290° C. or higher.

Example 6

A ceramic substrate having irregularities was coated with the low-temperature active catalyst in a slurry state of Example 4, dried and burned, thus forming a ceramic metal filter coated with a low-temperature active catalyst, which was then tested for NOx reduction efficiency in the temperature range of 250~300° C. The results are shown in [Table 5] below. The test conditions are the same as in Example 2.

TABLE 5

| Temp. (° C.) | 250 | 255 | 260 | 265 | 270 | 275 | 280 | 285 | 290 | 295 | 300 |
|---|---|---|---|---|---|---|---|---|---|---|---|
| DeNox (%) | 86 | 87 | 88 | 88 | 88 | 89 | 90 | 90 | 90 | 91 | 93 |

As is apparent from [Table 5], NOx reduction efficiency was 86% or more at 250° C. or higher, and 90% at 280° C. or higher.

Example 7

By sequentially performing 1) stirring DI water and a V precursor for 30 min; 2) adding a W precursor and stirring the resulting mixture for 30 min while performing pH adjustment to 2~3; 3) adding Ti-PILC and stirring the resulting mixture for 2 hr; 3a) adding $TiO_2$ and stirring the resulting mixture for 2 hr; 3b-1) adding a Ce precursor and stirring the resulting mixture for 30 min; 3b-2) adding a Fe precursor and stirring the resulting mixture for 30 min; 3b-3) adding a $SO_2$ precursor and stirring the resulting mixture for 30 min; and 4) adding alumina sol and stirring the resulting mixture for 30 min, a low-temperature active catalyst in a slurry state was prepared, including a PILC support Ti-PILC, and 100 parts by weight of Ti-PILC, 3 parts by weight of V, 3 parts by weight of W, 5 parts by weight of $TiO_2$, 2 parts by weight of Ce, 3 parts by weight of Fe, 2 parts by weight of $SO_2$ and 15 parts by weight of alumina sol.

As such, Ti-PILC and DI (De-ionized) water (ion-free pure water) were provided at a weight ratio of 4:7.

Example 8

A metal substrate (made of stainless steel) having irregularities was coated with the low-temperature active catalyst in a slurry state of Example 7, dried and burned, thus forming a metal filter coated with a low-temperature active catalyst, which was then tested for NOx reduction efficiency in the temperature range of 250~300° C. The results are shown in [Table 6] below. As such, the test conditions are the same as in Example 2.

TABLE 6

| Temp. (° C.) | 250 | 255 | 260 | 265 | 270 | 275 | 280 | 285 | 290 | 295 | 300 |
|---|---|---|---|---|---|---|---|---|---|---|---|
| DeNox (%) | 80 | 81 | 81 | 85 | 90 | 91 | 93 | 93 | 94 | 96 | 96 |

As is apparent from [Table 6], NOx reduction efficiency was 80% or more at 250° C. or higher, and 90% at 270° C. or higher.

Example 9

A ceramic substrate having irregularities was coated with the low-temperature active catalyst in a slurry state of Example 7, dried and burned, thus forming a ceramic metal filter coated with a low-temperature active catalyst, which was then tested for NOx reduction efficiency in the temperature range of 250~300° C. The results are shown in [Table 7] below. The test conditions are the same as in Example 2.

TABLE 7

| Temp. (° C.) | 250 | 255 | 260 | 265 | 270 | 275 | 280 | 285 | 290 | 295 | 300 |
|---|---|---|---|---|---|---|---|---|---|---|---|
| DeNox (%) | 82 | 82 | 90 | 91 | 90 | 91 | 93 | 95 | 96 | 97 | 97 |

As is apparent from [Table 7], NOx reduction efficiency was 82% or more at 250° C. or higher, and 90% at 260° C. or higher.

As seen in [Table 2] to [Table 7], the low-temperature active catalyst suitable for use in a metal filter for purifying exhaust gases from ships according to the present invention can be confirmed to exhibit superior NOx removal efficiency in the order of Example 1<Example 4<Example 7.

Also, in the case where a typical metal substrate is used, NOx removal efficiency is known to be lower than when using a ceramic substrate, but the use of the metal substrate 10 having irregularities according to the present invention can manifest almost the same NOx removal efficiency as in the ceramic substrate.

Furthermore, actual ships have SV (space velocity) of about 5,000~10,000 $h^{-1}$, and thus upon operation thereof, the reaction time between reaction gases and low-temperature active catalyst sites may increase and the amount of reactable gases may also increase, compared to SV 20000 $h^{-1}$ which is the test condition in Examples 2, 3, 5, 6, 8 and 9. Therefore, NOx reduction efficiency is considered to be further improved compared to the performance shown in [Table 2] to [Table 7].

Example 10

The metal filter of Example 8, the ceramic metal filter of Example 9 and a conventional extruded catalytic filter for ships were evaluated in terms of catalyst adhesion. The results are shown in [Table 8] below.

Catalyst adhesion was evaluated in such a manner that respective test samples were placed in beakers containing water, the beakers were placed in a sonicator, ultrasonic waves were applied at 40 MHz for 3 min, the test samples were sufficiently dried for 24 hrs, and then the weights thereof were measured, thus calculating the catalyst loss and the catalyst adhesion.

TABLE 8

|  | Extruded catalytic filter (control) | Metal filter (Ex. 8) | Ceramic metal filter (Ex. 9) |
|---|---|---|---|
| Adhesion | 75% | 95% | 45% |

An adhesion test is used to evaluate bondability between a catalyst and a substrate. As the bondability of a catalyst is lowered, the amount of the remaining catalyst attached to the substrate is decreased, so that the reaction site able to remove NOx becomes small, and thus, the total NOx removal performance of the filter for purifying exhaust gases from ships is considered to deteriorate.

As is apparent from [Table 8], adhesion was superior in the order of the conventional extruded catalytic filter<the inventive ceramic metal filter<the inventive metal filter.

Superior adhesion as above is mainly based on the use of alumina sol in a sol state having a needle-shaped structure of alumina alone and the appropriate composition ratio thereof, and the surface properties of the metal substrate having irregularities.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A metal filter for purifying an exhaust gas from a ship, suitable for use in removing nitrogen oxide from the exhaust gas, the metal filter comprising a metal substrate having irregularities and a low-temperature active catalyst applied onto the metal substrate and comprising Ti-PILC (Pillared Clay) as a powder support and vanadium (V), tungsten (W) and alumina sol supported thereon.

2. The metal filter of claim 1, wherein the low-temperature active catalyst comprises, based on 100 parts by weight of Ti-PILC (Pillared Clay), 1~10 parts by weight of V, 1~5 parts by weight of W, and 5~20 parts by weight of alumina sol.

3. The metal filter of claim 2, wherein the low-temperature active catalyst further comprises, based on 100 parts by weight of Ti-PILC, 1~5 parts by weight of cerium (Ce), 5~20 parts by weight of titanium dioxide ($TiO_2$), 1~6 parts by weight of iron (Fe), and 1~5 parts by weight of sulfur dioxide ($SO_2$).

4. The metal filter of claim 1, wherein the low-temperature active catalyst further comprises, based on 100 parts by weight of Ti-PILC, 1~5 parts by weight of cerium (Ce), 5~20 parts by weight of titanium dioxide ($TiO_2$), 1~6 parts by weight of iron (Fe), and 1~5 parts by weight of sulfur dioxide ($SO_2$).

* * * * *